(12) United States Patent
Baker (10) Patent No.: US 7,474,078 B2
(45) Date of Patent: Jan. 6, 2009

(54) CELL MAINTENANCE DEVICE FOR FUEL CELL STACKS

(75) Inventor: Howard S. Baker, Randolph, MA (US)

(73) Assignee: Texaco Inc., San Ramon, CA (US)

( * ) Notice: Subject to any disclaimer, the term of this patent is extended or adjusted under 35 U.S.C. 154(b) by 52 days.

(21) Appl. No.: 10/740,740

(22) Filed: Dec. 19, 2003

(65) Prior Publication Data

US 2005/0136293 A1    Jun. 23, 2005

(51) Int. Cl.
*H01M 10/46*    (2006.01)
(52) U.S. Cl. ...................................... 320/134
(58) Field of Classification Search ............... 320/129, 320/134–136, 139, 101, 141; 429/17, 13; 324/430–433
See application file for complete search history.

(56) References Cited

U.S. PATENT DOCUMENTS

| | | | | |
|---|---|---|---|---|
| 5,998,968 A | * | 12/1999 | Pittman et al. | 320/130 |
| 6,096,449 A | | 8/2000 | Fuglevand et al. | 429/13 |
| 6,313,637 B1 | * | 11/2001 | Iino et al. | 324/434 |
| 6,541,941 B2 | | 4/2003 | Adams et al. | 320/121 |
| 6,635,369 B2 | * | 10/2003 | Uribe et al. | 429/13 |
| 6,762,587 B1 | | 7/2004 | Barbetta | |

2003/0022033 A1    1/2003    Stimming et al.

FOREIGN PATENT DOCUMENTS

WO    WO 94/01181    1/1994

OTHER PUBLICATIONS

Chapter 49—"Handbook of Fuel Cells—Fundamentals, Technology and Applications," edited by Wolf Vielstich, Hubert A. Gasteiger, Arnold Lamm. © 2003 John Wiley & Sons, Ltd.
Darling et al., Kinetic Model of Platinum Dissolution in PEMFCs, *Journal of the Electrochemical Society*, 150, (2003), pp. A1523-A1527.

* cited by examiner

*Primary Examiner*—Edward Tso
(74) *Attorney, Agent, or Firm*—Williams Morgan & Amerson; Frank C. Turner; Melissa Patangia (57) ABSTRACT

A method and apparatus for maintaining the cells of a fuel cell stack are disclosed. The apparatus includes a fuel cell maintenance device including means for imposing a low impedance across at least one cell of a fuel cell stack, e.g., a switch, and a pulse generator. The pulse generator is capable of pulsing a cathode of the at least one cell of through the low impedance imposing means, e.g., when the switch is closed. The method transparently maintains the cells of a fuel cell stack, and includes sequentially pulsing the cathodes of a plurality of cells in a fuel cell stack, and maintaining a consistent number of the cells providing power to a load of the fuel cell stack while sequentially pulsing the cathodes of the cell.

40 Claims, 6 Drawing Sheets

CELL MAINTENANCE DEVICE FOR FUEL CELL STACKS

BACKGROUND OF THE INVENTION

1. Field of the Invention

The present invention pertains to fuel cells, and, more particularly, to a cell maintenance device for fuel cell stacks.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream, which can be used as a feed for fuel cells. Hydrocarbon-based fuels, such as natural gas, LPG, gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulphurization, high temperature water-gas shift, low temperature water-gas shift, selective CO oxidation, or selective CO methanation. Alternative processes include hydrogen selective membrane reactors and filters.

Thus, many types of fuels can be used; some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

Figure 1:
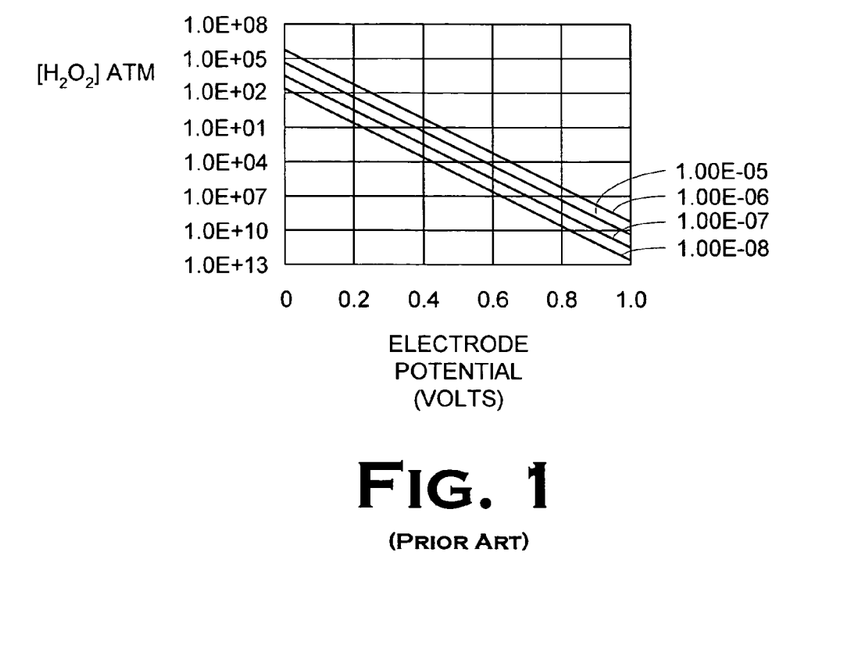
FIG. 1 graphs partial pressures of oxygen versus electrode potential as is conventionally known.

One problem arising in proton exchange membrane ("PEM") fuel cells used with fuel processors is the formation of hydrogen peroxide on the platinum catalyst of precious metals catalyzed reactors. One mode of decay in PEM fuel cells is due to the formation of hydrogen peroxide at the anode of the fuel cell. The hydrogen peroxide currently limits PEM fuel cell life. This mechanism was first elucidated by A. B. LaConti in the 1960's. See "Mechanisms of membrane degradation (polymer electrolyte membrane fuel cells and systems, PEMFC)", A. B. LaConti, M. Hamdan, and R. C. McDonald, *Handbook of Fuel Cells;* Vol. 3, Ch 49, pp 647-662, Edited by W. Vielstich, A. Lamm, and H. Gasteiger, Wiley, Chichester UK, 2003. Hydrogen peroxide is a strong oxidant that attacks the fuel cell membrane. It is generally formed by oxygen diffusing from the fuel cell cathode to the anode. The graph in FIG. 1 shows that even with very low oxygen partial pressure, the peroxide partial pressure can be quite high at anode potentials (~0.0 volts). It is apparent from FIG. 1 that, if the anode potential is raised 200 millivolts, the peroxide concentration drops by three orders of magnitude.

More particularly, platinum oxide is a relatively inactive catalyst for oxygen reduction. Platinum forms a hydrated oxide $Pt(OH)_2$ according to the equilibrium relation:

The equilibrium potential for forming the hydrated oxide is given by:

$$E_o = 0.98 - 0.0591 \, pH$$

Atlas of Electrochemical Equilibria in Aqueous Solutions ($2^{nd}$ ed), M. J. N. Pourbaix, NACE, Houston, Tex. 1974, page 379 ("Pourbaix"). Pourbaix also shows how higher oxides may form. In addition, Pourbaix shows a complex relationship between Pt, PtO, $PtO_2$ and $Pt^{2+}$ ion.

Figure 2:
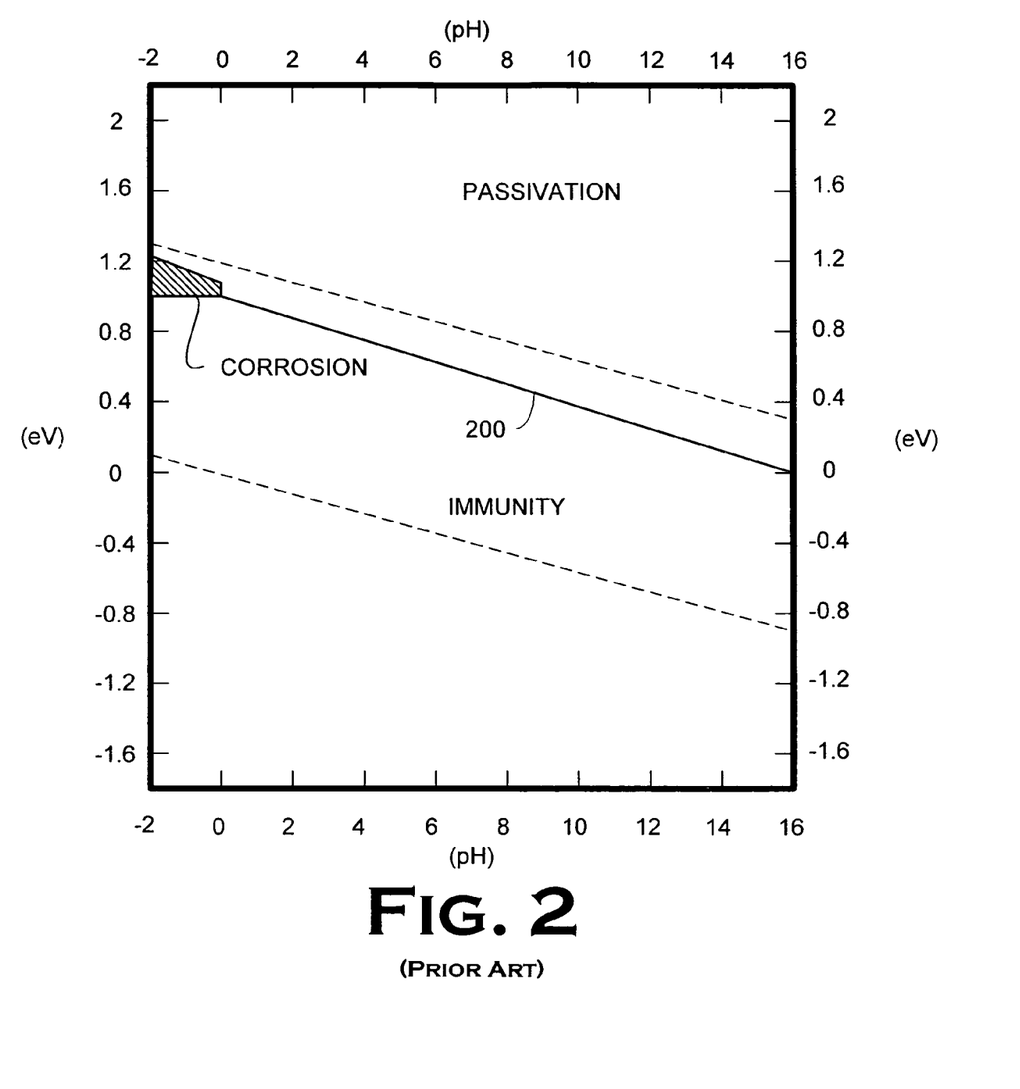
FIG. 2 illustrates the theoretical domains of corrosion, immunity, and passivation of platinum at 25° C. as is conventionally known.

The result of these reactions and relations are shown in FIG. 2, which is modified from Pourbaix. FIG. 2 shows the domains of immunity where Pt does not corrode and the domain of passivation where Pt corrodes to a stable hydrated oxide. The oxides are not especially catalytic for oxygen reduction. An inspection of FIG. 2 shows that dropping the cathode potential below the solid line 200, will make the platinum oxide unstable, and make the metal stable. If the cathode potential is allowed to move above the line 200, the oxide will be stable and the metal will be unstable. The process is also complex because the local pH has an effect on the process as well. Increasing the pH, as might occur under high current conditions (e.g., from cathodic proton consumption), will favor the formation of the oxide at lower cathode potentials.

These and other, similar problems have been known for more than 40 years. During this time, the art has sought to find a technically feasible, economically viable solution to these challenges. The problem is exacerbated by competition from alternative technologies, which are already capable generating and providing power at extremely low costs, due in part to an already installed infrastructure. Several approaches have been proposed, but none have found commercial acceptance.

The present invention is directed to resolving, or at least reducing, one or all of the problems mentioned above.

SUMMARY OF THE INVENTION

The invention comprises a method and apparatus for maintaining the cells of a fuel cell stack. The apparatus includes a fuel cell maintenance device comprising means for imposing a low impedance across at least one cell of a fuel cell stack, e.g. a switch, and a pulse generator. The pulse generator is capable of pulsing a cathode of the at least one cell of through the low impedance imposing means, e.g., when the switch is closed. The method transparently maintains the cells of a fuel cell stack, and comprises sequentially pulsing the cathodes of a plurality of cells in a fuel cell stack, and maintaining a consistent number of the cells providing power to a load of the fuel cell stack while sequentially pulsing the cathodes of the cell

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 3:
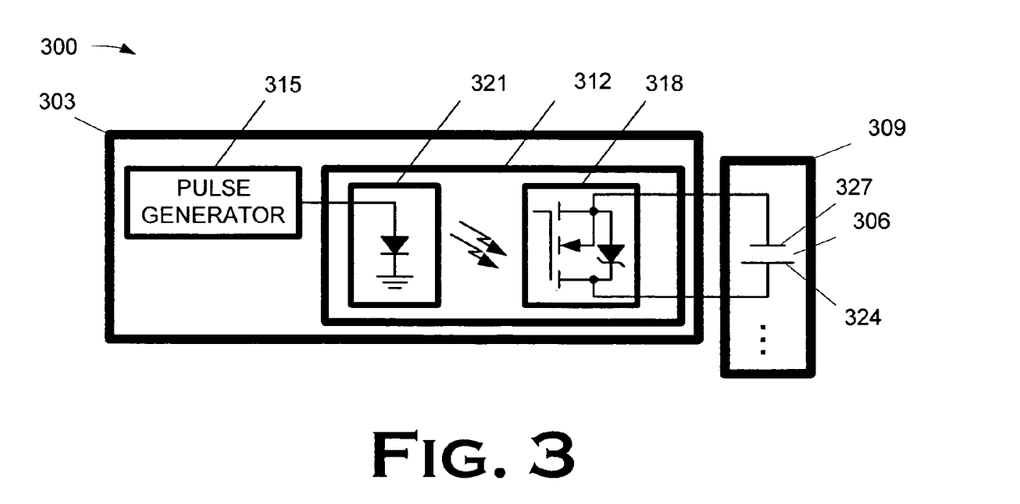
FIG. 3 illustrates one particularly embodiment of a fuel cell maintenance device in accordance with the present invention.

Turning now to the drawings, FIG. 3 illustrates one particularly embodiment 300 of the present invention. In the embodiment 300, a fuel cell maintenance device 303 maintains the cells 306 (only one indicated) of a fuel cell stack 309. The fuel cell maintenance device 303 comprises a switch 312 and a pulse generator 315. The switch 312 includes a relay 318 capable of shorting at least one cell 306 of the fuel cell stack 309 and a dielectrically isolated driver 321 capable of driving the relay 318. In one particular embodiment, the relay 318 may be a solid-state relay such as is known to the art. The pulse generator 315 is capable of pulsing a cathode 324 of at least one cell 306 of the fuel cell stack 309 through the switch 312 when the switch 312 is closed. The pulse generator 315 generates a digital pulse described more fully below.

Note that the switch 312, when closed, provides a low impedance across the cell(s) 306, which causes an external current to flow. The external current then lowers the cell voltage to the desired value, discussed more fully below. Thus, some embodiment may omit the switch 312 provided they employ some other mechanism to introduce the low impedance across the cell(s) 306. Thus, the switch 312 is, by way of example and illustration, but one means for imposing a low impedance across the cell(s) 306 when the cathodes thereof are pulsed.

Figure 4A:
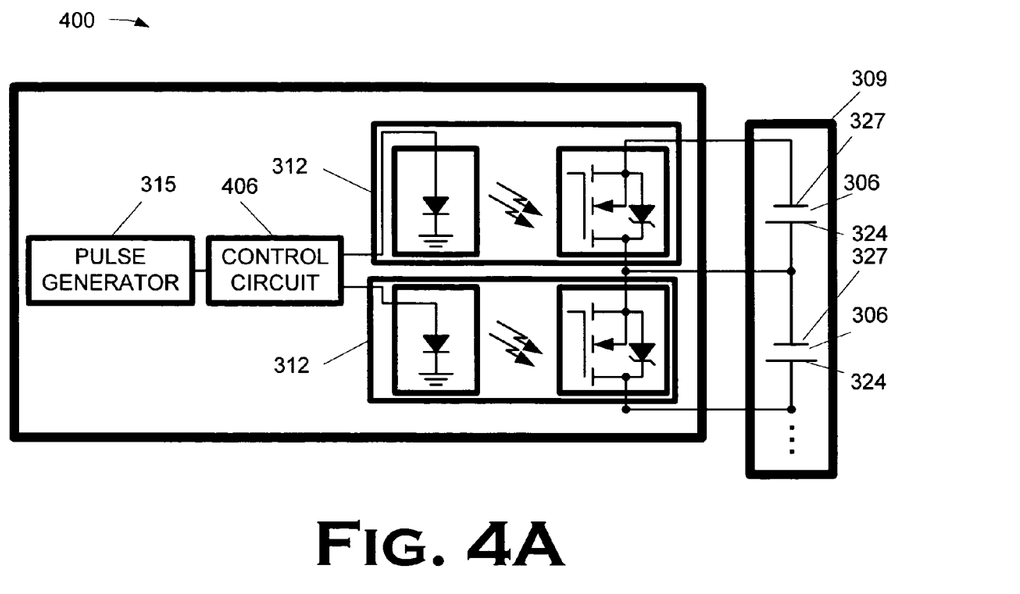
FIG. 4A and FIG. 4B illustrate alternative embodiments of the present invention.

The approach shown in the embodiment of FIG. 3 for pulsing the cathode 324 of the cell 306 can be extrapolated to cover a plurality of cells 306. One such embodiment 400 is illustrated in FIG. 4A. In FIG. 4A, the fuel cell maintenance device comprises a plurality of switches 312. Each switch 312 closes to permit a pulse generator 315 to pulse the cathodes 324 of a respective cell 306. In the illustrated embodiment, a control circuit 406 closes the switches 312 serially so that the cathodes 324 of the cells 306 are pulsed serially. The pulse is transmitted to the drivers through a multiplexer. The pulse is also used to clock the counter to address the multiplexer, which sequentially selects the driver, all as is more fully disclosed below.

Figure 4B:
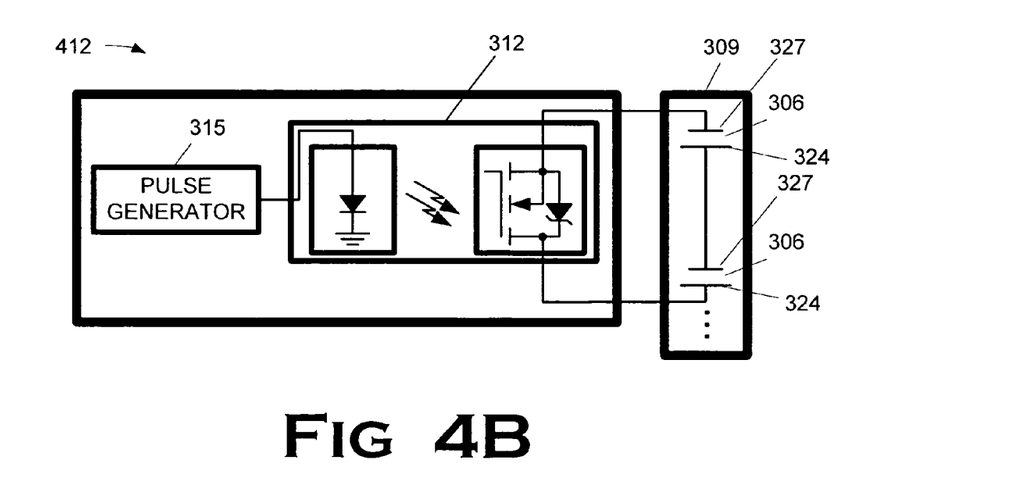

In some embodiments, the cathodes 324 of multiple cells 306 in the fuel stack 309 may be pulsed by the pulse generator 315 through the same switch 312. One such embodiment 412 is shown in FIG. 4B. Because there is only one switch 312, there is no need for a counterpart to the control circuit 406 in the embodiment 300 of FIG. 4A. However, the embodiment 412 can be extrapolated across additional cells 306 of the fuel stack 309 in a manner analogous to the way in which the embodiment 300 is extrapolated in FIG. 4A. In such embodiments, a counterpart to the control circuit 406 in the embodiment 300 should be employed to control the serial operation of the switches 312.

The electrical characteristics of the pulse output by the pulse generator 315 can affect the performance of the present invention. It is known that, at cell voltages below 0.6V, the cathode platinum catalyst is cleaned of hydroxides, and in the process, the catalyst is activated. However, the effects of pulsing the cell voltage and of the pulse size and duty cycle on the efficacy of such pulsing have not previously been known to the art.

Figure 5:
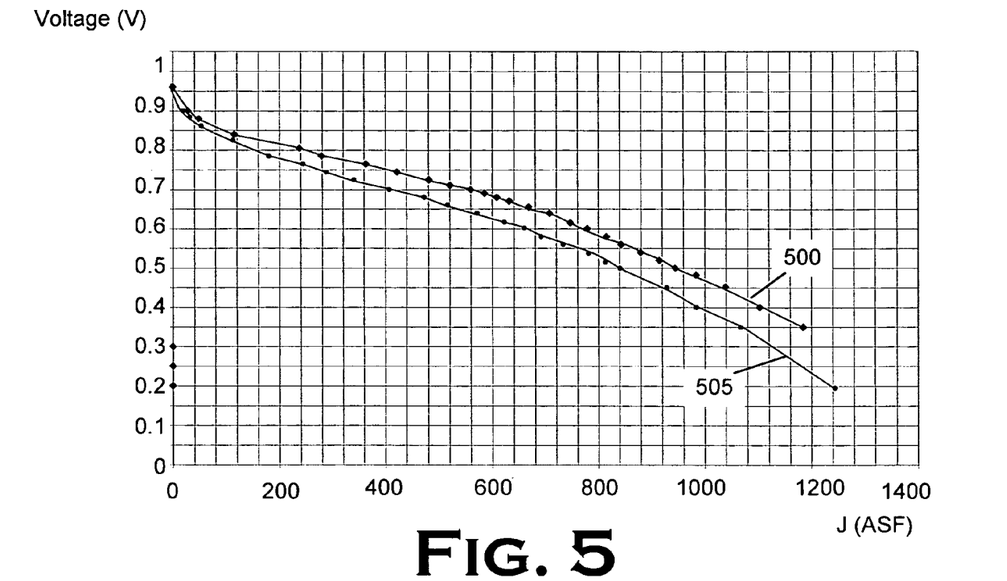
FIG. 5 presents a performance plot comparing a cell run with pulsing and a cell run with steady currents.

FIG. 5 presents a performance plot comparing a cell run with pulsing and a cell run with steady currents. The performance plots show that current-pulsing results in a marked improvement in cell performance. It should be noted that these data are average current densities at each voltage. Pulsing conditions for the plot shown below were as follows: 5 second 0.05V pulse every 120 seconds. The performance improves with a shorter, more frequent pulse, as shown in FIG. 5, wherein the curve 500 represents the performance of a current boosted fuel cell and the curve 504 represents the performance of a steady fuel cell. The plot was generated from a test conducted on a 2.5"×2.5" single graphite cell at a cell temperature of 150° F., a saturation temperature of 120° F., with 10 psig back-pressure on cathode, 8 psig back-pressure on anode, 20% Uh, and 30% Uo. These same conditions were also used to generate the information presented below.

The pulse size is one important electrical characteristic. Pulses were varied between 0.4 V and 0.05 V across one cell, for 5 seconds every 120 seconds. Table 1 show, in columns two and three, the current densities 10 seconds and thirty seconds after the pulse. It should be noted that neither the 0.3V nor the 0.4 V pulse was run long enough to reach a stable point. The average current density would have declined further than the numbers indicated in Table 1. All else being equal, the lower the electrical potential per cell the better the performance. For practical reasons, it may be difficult to go below 0.2V per cell, but the circuitry should allow the cell to go below 0.3V. The low-voltage/high current requirement may require pulsing more than one cell at a time, e.g., as in the embodiment 412 in FIG. 4B, in some embodiments.

TABLE 1

Current Densities by Pulse Size

| Pulse Size (V) | Base cell voltage (V) | $J_{10}$(ASF) | $J_{30}$(ASF) |
|---|---|---|---|
| .05 | 0.7 | 670 | 650 |
| .1 | 0.7 | 670 | 640 |
| .2 | 0.7 | 660 | 640 |
| .3 | 0.7 | 660 | 635 |
| .4 | 0.7 | 615 | 600 |

Figure 6:
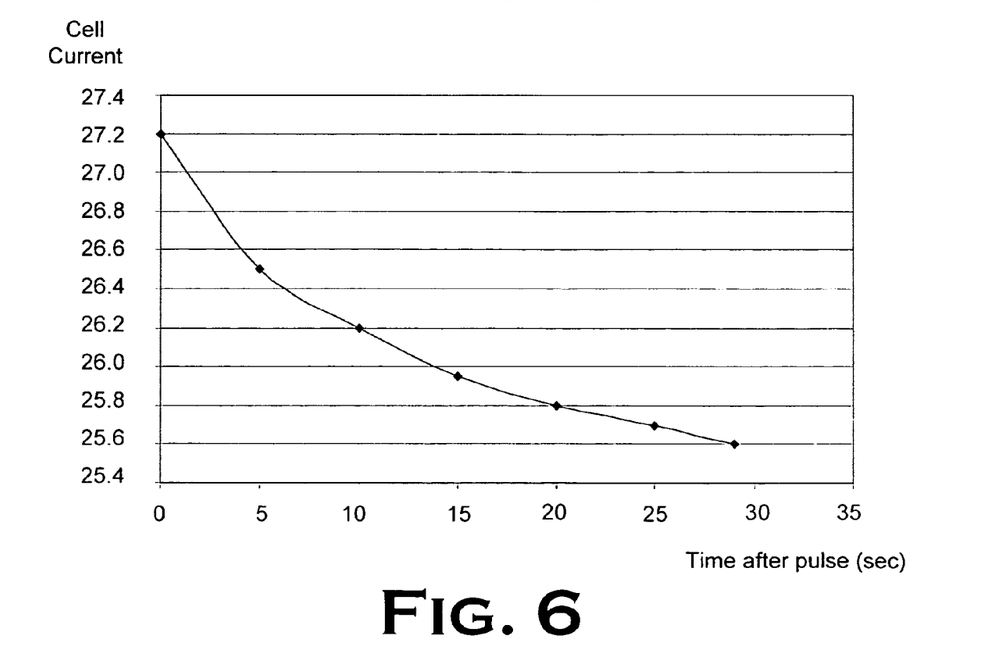
FIG. 6 graphs cell current versus time after receipt of a pulse.
Figure 7:
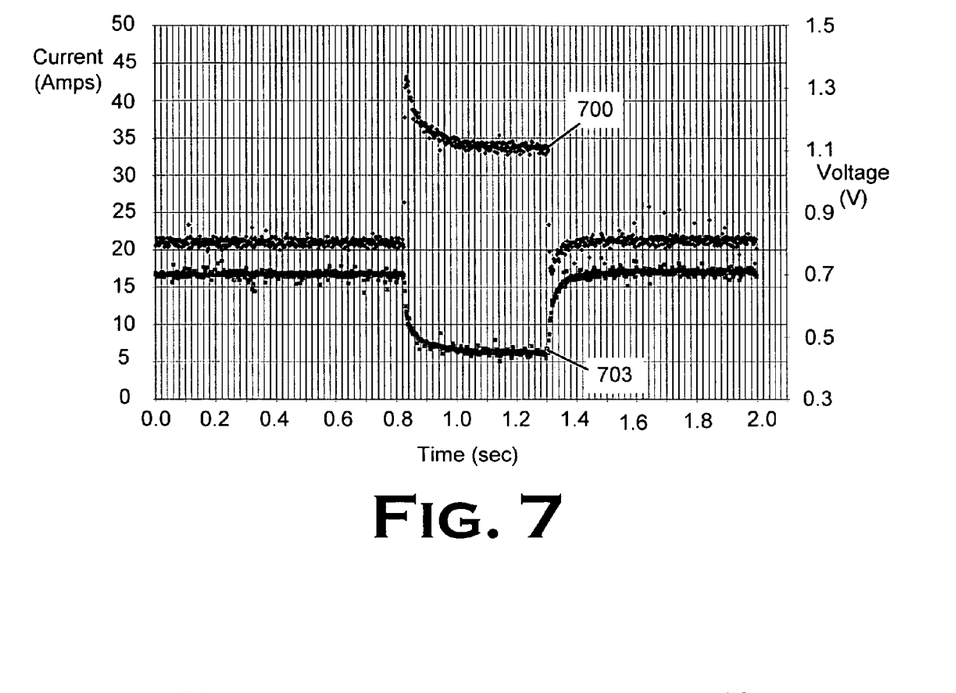
FIG. 7 graphs cell voltage and cell current over time.

The length and the frequency of the pulse are also important. The performance of the cell decreases after every pulse. A typical example is shown below in FIG. 6, which presents the decay of current immediately following a 1 second pulse at 0.2V. Cell is held at 0.7V during the decay period. Such a plot indicates that a shorter period between pulses would be beneficial. Pulses of shorter length and greater frequencies were compared to longer pulses and longer periods while all flows, temperatures, pressures were held constant. The results are shown in Table 2. The last column in the table shows the average current density between each pulse, during which time the cell voltage was held at 0.7 V. The power from the cell can be calculated by (1-Duty cycle)*average power. Thus, a short frequent pulse is superior to a long infrequent pulse. However, the cell's capacitance limits how short a pulse can be. As can be seen in the oscilloscope data shown in FIG. 7, in which the upper trace 700 and lower trace 703 represent the current and voltage, respectively, 70 to 100 ms is needed for the cell's voltage to climb back to its baseline state. Similarly, the cell's capacitance limits the speed with which the cell's voltage drops to its pulse level. In FIG. 7, approximately 100 ms is needed for the voltage to decay to 0.4V.

TABLE 2

Pulse Length and Frequency

| Pulse length(s) | Pulse size (V) | Pulse frequency (Hz) | Duty cycle | Average J @ 0.7 V |
|---|---|---|---|---|
| 5 | .2 | 1/150 | 3.33% | 550 |
| 2 | .2 | 1/60 | 3.33% | 584 |
| 1 | .2 | 1/30 | 3.33% | 602 |
| .5 | .2 | 1/15 | 3.33% | 607 |

FIG. 7 shows the cell's response to a change in load resistance from approximately 32 mΩ to approximately 12 mΩ. A full sized cell would require a lower resistance of the circuit to drop to 0.4 V. It can be seen that the cell's voltage changes more slowly than the current, due to the capacitance of the cell. It is also shown that it will be necessary to drive a slightly higher current through the circuitry initially after the short, before the cell voltage decreases to its "pulse level."

Figure 8:
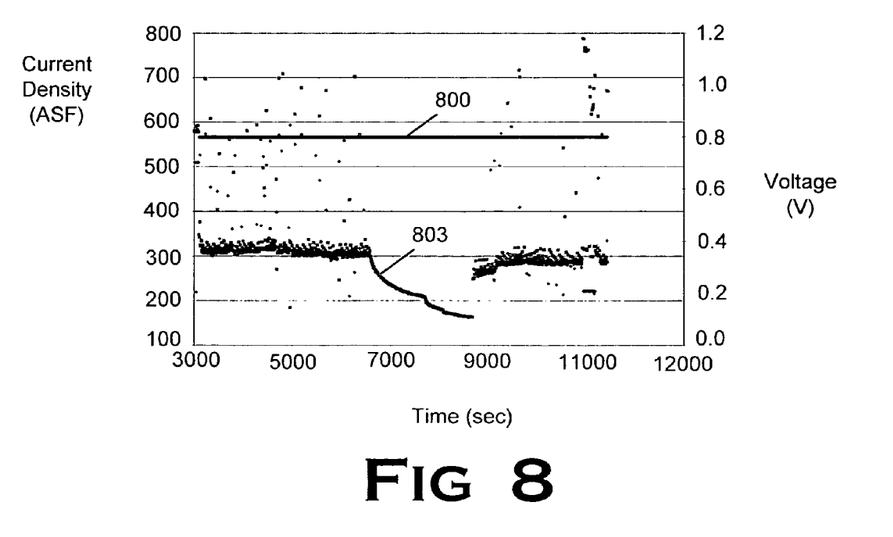
FIG. 8 graphs current density and cell voltage over time.

The cell was also cycled between 0.2V and 0.8V, with a pulse width of 0.5 seconds and a period of 15 seconds with a duty cycle of 3.33%. As shown in FIG. 8, in which the trace 800 represents voltage over time and the trace 803 represent current over time, the cell maintained an average current density near 300 ASF at 0.8V. When the pulsing is interrupted, the current density decreases to below 180 ASF and continues to decline until the pulsing is re-started, at which point the cell's current density climbs to near 300 ASF.

The implementation of any given embodiment of the present invention will depend on the size of the fuel cell, the performance of the fuel cell, and the voltage at which the cell is run between peaks. Table 3 indicates several points of consideration when designing a cell maintenance device for a stack. Typically, bringing the cell current density from 600 to 1200 ASF was enough to drive the cell potential to 0.2 V, keeping the flows constant and set for 26 amps (600 ASF). Since the experiments were done at very low utilizations, it is likely that the actual values required for current would be less than those predicted by the tests. The values shown below are best predictions, based on experiments done with slightly less airflow. Other considerations include:

the pulse voltage (listed as 0.2V) may not be sufficient to drive enough current through the external circuit in some embodiments, and it may therefore be desirable to pulse more than one cell at a time, or to have more than one circuit per cell in some embodiments (e.g., the embodiment 312 in FIG. 4B). For example, in order to drive enough current through the MOSFET switch, it may be desirable to increase the Drain-to-Source voltage (Vds) which is supplied by the fuel cell. The addition of Vds is easily accomplished by pulsing the MOSFET switch, which would be connected to more than one cell, e.g., 2, 3 or more cells.

a larger current through the stack decreases the amount of current needed through the circuit in order to reach the desired pulse voltage. For example, in rows 1 and 2 of Table 3 are a case for a stack run at 0.8V per cell and 300 ASF and a case for a stack run at 0.7V per cell and 500 ASF. In order to drive the 0.8V cell down to 0.2V, 72 Amps are needed through the external circuitry. In order to drive the 0.7V cells to 0.2V, only 40 Amps are needed through the external circuitry.

a smaller cell size similarly decreases the amount of current needed to drive the cell to the appropriate voltage (<0.3 V).

Still other considerations may come into play in other embodiments.

TABLE 3

Predicted Values

| $J_{stack}$ | Cell Area (ft$^2$) | Stack Current | $V_{pulse}$ | $I_{total}$ | ASF Boost | $I_{circuit}$ |
|---|---|---|---|---|---|---|
| 300 | 0.16 | 48 | 0.2 | 120 | 750 | 72 |
| 500 | 0.16 | 80 | 0.2 | 120 | 750 | 40 |
| 300 | 0.1 | 30 | 0.2 | 75 | 750 | 45 |
| 500 | 0.1 | 50 | 0.2 | 75 | 750 | 25 |

Figure 9:
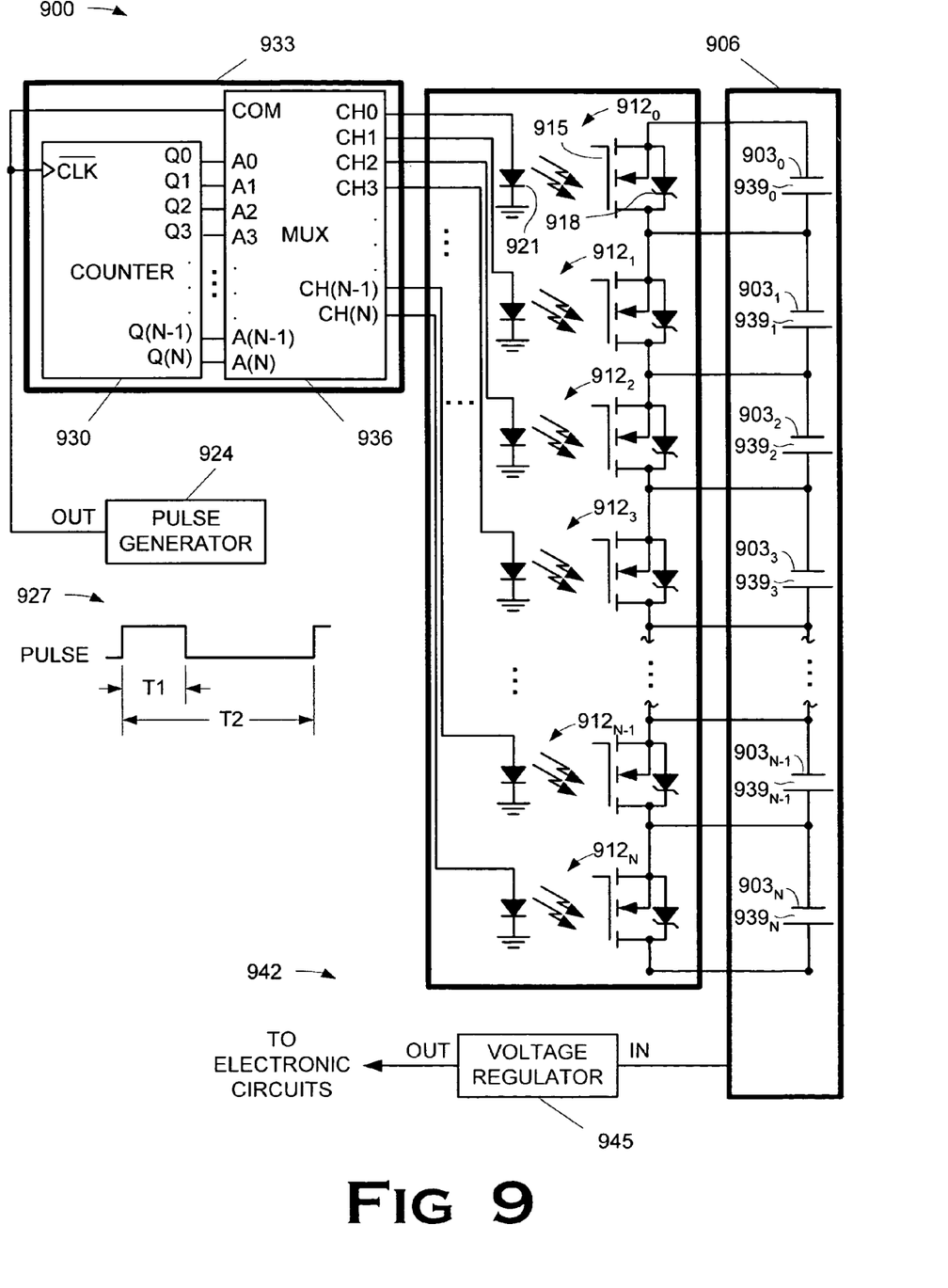
FIG. 9 illustrates one particular implementation of the present invention in which the cells of a fuel cell stack are maintained transparently to the load of the fuel cell stack.

FIG. 9 illustrates one particular embodiment 900 in which the present invention is used to maintain the cells 903 of a fuel cell stack 906 in a manner transparent to the load (not shown) of the fuel cell stack 906. The fuel cell stack 906 comprises a plurality of cells $903_0$-$903_N$. Each cell $903_0$-$903_N$ has a respective switch $912_0$-$912_N$ electrically connected in parallel across the cell $903_0$-$903_N$. Each switch 912 comprises a metal oxide semiconductor, field effect transistor ("MOSFET", only one indicated) 915 in parallel with an avalanche diode 918 (only one indicated). The MOSFET 915 and avalanche diode 918 function together as does the relay 318 in FIG. 3. As noted above, the MOSFET 915 and avalanche diode 918 may be packaged together as a solid-state relay. However, some embodiments may employ discrete MOSFETs 915 and avalanche diodes 918 or integrate the MOSFET 915 and avalanche diode 918 into a single package. Each switch $912_0$-$912_N$ also includes a dielectrically isolated diode 921 (only one indicated) that drives the MOSFET 915 and avalanche diode 918.

A pulse generator 924 generates a train of pulses 927 whose characteristics are determined in light of the considerations set forth above. A counter 930 in a control circuit 933 receives the pulse train as a clock, i.e., the pulse train also drives the counter 930. The count (i.e., $Q_0$-$Q_N$) is output to a multiplexer 936 of the control circuit 933, which also receives the pulse train at its COM input. The multiplexer 936 outputs the pulse train onto the selected line $CH_0$-$CH_N$ determined by the count of the counter 930. Thus, each time the pulse generator 924 generates a pulse 927, the count of the counter 930 increments and the multiplexer 936 selects the next line $CH_0$-$CH_N$ as its output for the pulse 927. When the counter 930 counts to N, it resets to 0. For each pulse 927 in the pulse train generated by the pulse generator 924, one cell $903_0$-$903_N$ is pulsed. No more than one cell $903_0$-$903_N$ is pulsed at any given time in this particular embodiment.

The cathodes $939_0$-$939_N$ for each cell $903_0$-$903_N$ are therefore individually pulsed one at a time in serial and consecutively, i.e., pulsing is switched from one cell $903_0$-$903_N$ to another, rather than on and off to a single cell $903_0$-$903_N$. Since one and only one cell $903_0$-$903_N$ is being pulsed at any given time, the load for the fuel cell 906 receives power from N−1 of the cells $903_0$-$903_N$. Note, however, that two cells or more cells $903_0$-$903_N$ may be pulsed in this manner, i.e., serially and consecutively, in some embodiments. The maintenance of the cells $903_0$-$903_N$ is therefore transparent to the load and power to the load remains at a constant level since the number of cells $903_0$-$903_N$ that are not being pulsed remains constant.

Note that the embodiment 900 of FIG. 9 includes a voltage return 942 from the fuel cell stack 906 that is used to provide DC power to the electronic circuits of the, e.g., the pulse generator 924, the counter 930, and the multiplexer 936. A voltage regulator 945 is provided in the voltage return 942 to regulate the returned voltage to levels utilized by the electronic circuits. The embodiment 900 therefore needs no external power supply for the electronic circuits. However, some embodiments might choose to provide such an external power source and eliminate the voltage return 942.

The present invention can also be used to address other maintenance issues in addition to the formation of hydrogen peroxide on the cathode of a cell in a fuel stack. For instance, another problem in some fuel cell applications is the accumulation of carbon monoxide on the catalyst. When present at a PEM fuel cell anode, carbon monoxide preferentially adsorbs on the catalyst surface thereof. The surface available for hydrogen oxidation is reduced and the area that is available for oxidation must operate at a higher local current density than it would if the complete catalyst surface was available. The fraction of the surface area covered by the carbon monoxide is controlled by an adsorption isotherm. The higher the temperature, the less the surface area covered by carbon monoxide.

This is also true in precious metal catalyzed reactors. Such reactors are called is selective oxidizers or preferential oxidizers. These reactors are used to remove trace amounts of carbon monoxide from a gas stream. The catalyst particle in such reactors are characterized by the same chemisorption phenomena as we have ascribed to fuel cell anodes. There is competitive adsorption between the carbon monoxide and the oxygen. As the temperature is increased in such reactors, the surface area covered by the carbon monoxide is reduced and more surface is available for oxidation. The rate of chemical oxidation of carbon monoxide to carbon dioxide is given by:

$$N_{CO2}d/dt = k[O_2]/[CO]$$

where:
$N_{CO2}d/dt$ is the evolution rate of carbon dioxide;
$[O_2]$ is the oxygen concentration; and
$[CO]$ is the carbon monoxide concentration.

S. Benson, *Foundation of Chemical Kinetics*. This means that the reaction rate is inversely proportional to the carbon monoxide concentration.

Since the oxidation of carbon monoxide is vigorously exothermic, it often happens that selective oxidation reactors develop a "hot spot" at the point where the temperature is high enough to permit sufficient oxygen to adsorb and react with chemisorbed carbon monoxide. The conventional selective oxidizer is usually designed to have its "hot spot" at the end of the reactor. This gets the hot gas off the catalyst when all the oxygen has disappeared. If the hot gas is allowed to contact a catalyst when the oxygen is removed, then it will back shift and form carbon monoxide from hydrogen and carbon dioxide. This makes it very difficult to vary the flow in the selective oxidizer as one might wish to do under conditions of load variation.

Returning now to FIG. 3, the technique employed by the present invention to simultaneously pulse the anode 327 as well as the cathode 324. Note that, while hydrogen peroxide formation is an issue in all fuel cells, carbon monoxide formation is an issue primarily in implementations using a reformed fuel stream. Conversely, carbon monoxide formation will not be an issue where the fuel cell stack is fueled by pure hydrogen. Thus, not all embodiments will pulse the anode 327 in addition to the cathode 324.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:
1. A fuel cell maintenance device, comprising:
   a switch;
   a pulse generator capable of pulsing a cathode of at least one cell of a fuel cell stack through the switch when the switch is closed wherein the pulse generator generates a digital pulse;
   a relay capable of shorting the cell of a fuel cell stack; and
   a dielectrically isolated driver capable of driving the relay.
2. The fuel cell maintenance device of claim 1, wherein the relay comprises a solid-state relay.
3. The fuel cell maintenance device of claim 1, wherein the relay is further capable of shorting a second cell of the fuel cell stack.
4. The fuel cell maintenance device of claim 1, further comprising:
   a second switch through which the pulse generator is capable of pulsing a cathode of a second cell when the second switch is closed; and a control circuit capable of controlling to which of the first and second relays the pulse generator output is transmitted.

5. The fuel cell maintenance device of claim 4, wherein the second switch includes:
   a second relay capable of shorting at least a second cell of a fuel cell stack; and
   a second dielectrically isolated driver capable of driving a second relay responsive to the pulse generator output.

6. The fuel cell maintenance device of claim 5, wherein at least one of the first relay and the second relay is further capable of shorting one of a third cell and a fourth cell of the fuel cell stack.

7. The fuel cell maintenance device of claim 1, wherein at least one of the switch and the pulse generator is capable of receiving power returned from the fuel cell stack.

8. The fuel cell maintenance device of claim 7, further comprising a voltage regulator coupled to at least one of the switch and the pulse generator and configured to receive the power returned from the fuel cell stack.

9. The fuel cell maintenance device of claim 1, wherein the pulse generator is capable of pulsing a cathode of a second cell when the switch is closed.

10. A fuel cell maintenance device, comprising:
   at least one relay capable of shorting at least one cell of a fuel cell stack;
   a dielectrically isolated driver capable of driving the relay;
   a pulse generator capable of pulsing a cathode of the cell through the relay when the dielectrically isolated driver closes the relay to short the cell wherein the pulse generator generates a digital pulse wherein at least one of the relay, the dielectrically isolated driver and the pulse generator is capable of receiving power returned from the fuel cell stack; and
   a voltage regulator through which at least one of the relay, the dielectrically isolated driver and the pulse generator is capable of received power returned from the fuel cell stack.

11. The fuel cell maintenance device of claim 10, wherein the relay comprises a solid-state relay.

12. The fuel cell maintenance device of claim 10, wherein the relay is further capable of shorting a second cell of the fuel cell stack.

13. The fuel cell maintenance device of claim 10, further comprising:
   a second relay capable of shorting at least a second cell of a fuel cell stack;
   a second dielectrically isolated driver capable of driving second relay responsive to the pulse generator output; and
   a control circuit capable of controlling to which of the first and second relays the pulse generator output is transmitted.

14. The fuel cell maintenance device of claim 13, wherein at least one of the first relay and the second relay is further capable of shorting one of a third cell and a fourth cell of the fuel cell stack.

15. The fuel cell maintenance device of claim 10, wherein the pulse generator is capable of pulsing a cathode of a second cell through the relay when the dielectrically isolated driver closes the relay to short the cell.

16. A fuel cell maintenance device for a fuel stack including at least one fuel cell, the fuel cell maintenance device comprising:
   at least one relay electrically connected in parallel across the cell;
   a dielectrically isolated driver operably associated with the relay to drive the relay;
   a pulse generator electrically connected to the dielectrically isolated driver to pulse a cathode of the cell through the relay when the dielectrically isolated driver closes the relay wherein the pulse generator generates a digital pulse; and
   a power return from the fuel cell stack to at least one of the pulse generator, the relay and dielectrically isolated driver, wherein the power return includes a voltage regulator.

17. The fuel cell maintenance device of claim 16, wherein the relay comprises a solid-state relay.

18. The fuel cell maintenance device of claim 16, wherein the relay is further electrically connected in parallel across a second cell of the fuel cell stack.

19. The fuel cell maintenance device of claim 16, further comprising;
   a second relay electrically connected in parallel across a second cell of a fuel cell stack;
   a second dielectrically isolated driver capable of driving second relay responsive to the pulse generator output; and
   a control circuit capable of controlling to which of the first and second relays the pulse generator output is transmitted.

20. The fuel cell maintenance device of claim 19, wherein at least one of the first relay and the second relay is further electrically connected in parallel across one of a third cell and a fourth cell of the fuel cell stack.

21. The fuel cell maintenance device of claim 16, wherein:
   the relay is electrically connected in parallel across a second cell; and
   the pulse generator is electrically connected to the dielectrically isolated driver to pulse a cathode of the second cell through the relay when the dielectrically isolated driver closes the relay.

22. An apparatus, comprising:
   a fuel stack, including a plurality of cells;
   a switch bank, including a plurality of switches, each switch electrically connected in parallel across at least one of the cells;
   a pulse generator capable of pulsing the cathodes of the cells when the respective switch is closed wherein the pulse generator generates a digital pulse;
   a control circuit electrically connected in series between the pulse generator and the switch bank to sequentially open and close the switches;
   a relay capable of shorting at least one cell of a fuel cell stack; and
   a dielectrically isolated driver capable of driving the relay.

23. The apparatus of claim 22, wherein the relay comprises a solid-state relay.

24. The apparatus of claim 22, wherein the relay is further capable of shorting a second cell of the fuel cell stack.

25. The apparatus of claim 22, wherein each switch is capable of shorting a plurality of cells.

26. The apparatus of claim 22, wherein at least one of the switch bank and the pulse generator is capable of receiving power returned from the fuel cell stack.

27. The apparatus of claim 26, further comprising a voltage regulator through which at least one of the switch bank and the pulse generator is capable of receiving power returned from the fuel cell stack.

28. The apparatus of claim 22, wherein control circuit includes:
   a counter driven by a clock; and a multiplexer multiplexing the output of the pulse generator to the switches responsive to the count of the counter.

29. A method for transparently maintaining the cells of a fuel cell stack, the method comprising:
sequentially pulsing the cathodes of a plurality of cells in a fuel cell stack, wherein sequentially pulsing the cathodes includes generating a pulse train and sequentially supplying the pulse train to the cells, wherein sequentially supplying the pulse train to the cells includes supplying the pulse train to a first cell of the fuel cell stack to pulse a cathode thereof; and switching the supply of the pulse train from the first cell to a second cell of the fuel stack to pulse a cathode thereof wherein a pulse generator generates a digital pulse; and
maintaining a consistent number of the cells providing power to a load of the fuel cell stack while sequentially pulsing the cathodes of the cells.

30. A method for transparently maintaining the cells of a fuel cell stack, the method comprising:
sequentially pulsing the cathodes of a plurality of cells in a fuel cell stack;
maintaining a consistent number of the cells providing power to a load of the fuel cell stack while sequentially pulsing the cathodes of the cells;
supplying the pulse train to a first cell of the fuel cell stack to pulse a cathode thereof wherein a pulse generator generates a digital pulse; and
switching the supply of the pulse train from the first cell to a second cell of the fuel stack to pulse a cathode thereof.

31. A fuel cell maintenance device, comprising:
means for imposing a low impedance across at least one cell of a fuel cell stack; wherein the low impedance imposing means includes a switch that imposes the low impedance when closed and receiving a pulse from the pulse generator; wherein the switch comprises a relay capable of shorting the cells of a fuel cell stack and a dielectrically isolated driver capable of driving the relay; and
a pulse generator capable of pulsing a cathode of the at least one cell of a fuel cell stack through the low impedance imposing means wherein the pulse generator generates a digital pulse.

32. The fuel cell maintenance device of claim 31, wherein the relay comprises a solid-state relay.

33. The fuel cell maintenance device of claim 31, wherein the relay is further capable of shorting a second cell of the fuel cell stack.

34. The fuel cell maintenance device of claim 31, further comprising:
second means for imposing a low impedance across at least a second cell of a fuel cell stack; and
a control circuit capable of controlling to which of the first and second low impedance imposing means the pulse generator output is transmitted.

35. The fuel cell maintenance device of claim 34, wherein the second low impedance imposing means includes a second switch that imposes the low impedance when closed and receiving a pulse from the pulse generator.

36. The fuel cell maintenance device of claim 35, wherein the second switch includes:
a second relay capable of shorting at least a second cell of a fuel cell stack; and
a second dielectrically isolated driver capable of driving a second relay responsive to the pulse generator output.

37. The fuel cell maintenance device of claim 36, wherein at least one of the first relay and the second relay is further capable of shorting one of a third cell and a fourth cell of the fuel cell stack.

38. The fuel cell maintenance device of claim 31, wherein at least one of the low impedance imposing means and the pulse generator is capable of receiving power returned from the fuel cell stack.

39. The fuel cell maintenance device of claim 38, further comprising a voltage regulator coupled to at least one of the switch and the pulse generator and configured to receive the power returned from the fuel cell stack.

40. The fuel cell maintenance device of claim 31, wherein the pulse generator is capable of pulsing a cathode of a second cell through the low impedance imposing means.

* * * * *